(12) United States Patent
Broms et al.

(10) Patent No.: US 8,112,342 B2
(45) Date of Patent: *Feb. 7, 2012

(54) ADJUSTABLE DERIVATIVE SECURITIES AND METHOD FOR ADJUSTING THE VALUE OF SAME DUE TO A CORPORATE EVENT

(76) Inventors: Peter A. Broms, Glen Ridge, NJ (US); Andrew M. Scott, Brooklyn, NY (US)

( * ) Notice: Subject to any disclaimer, the term of this patent is extended or adjusted under 35 U.S.C. 154(b) by 423 days.

This patent is subject to a terminal disclaimer.

(21) Appl. No.: 12/475,977

(22) Filed: Jun. 1, 2009

(65) Prior Publication Data

US 2009/0281964 A1    Nov. 12, 2009

Related U.S. Application Data

(63) Continuation-in-part of application No. 10/154,742, filed on May 24, 2002.

(51) Int. Cl.
*G06Q 40/00* (2012.01)
(52) U.S. Cl. .................................................. 705/36 R
(58) Field of Classification Search ............... 705/35–45
See application file for complete search history.

(56) References Cited

U.S. PATENT DOCUMENTS

2001/0037277 A1    11/2001    Willis et al.

OTHER PUBLICATIONS

Jack Clark Francis, et al., "The Handbook of Equity Derivatives," *Irwin Professional Publishing*, Chapter 13, pp. 284-329.
Robert Hunter, "Players: Peter Broms: 11 Years and Counting", *Derivative Strategy*, p. 4, Jul. 1999.
Tom Pratt, "Phlx takes on Amex with new Americus securities", *Investment Dealers Digest*, p. 14 (Jan. 30, 1995).
David Mayers et al., "Journal of Applied Corporate Finance", *Bank of America*, vol. 15, No. 1, pp. 128-136 (Spring 2000).
Options Clearing Corporation, "Characteristics and Risks of Standardized Options," Feb. 1994, pp. 19-21, 33.
Robert Geske, "The Pricing of Options with Stochastic Dividend Yield," The Journal of Finance, vol. 33, No. 2, May 1978, pp. 620-621.
Official Gazette of the United States Patent and Trademark Office, vol. 1162, No. 3, May 17, 1994, pp. 59-61.
Fischer Black & Myron Scholes, "The Pricing of Options and Corporate Liabilities," The Journal of Political Economy, vol. 81, No. 3, May-Jun. 1973, p. 639.
Moshe Levitin & Linda Volkert, "Changes to Stock Option Plans and Allocating Basis to Assets and Liabilities," Jul. 1991.
Clifford W. Smith Jr. & Jerold L. Zimmerman, "Valuing Employee Stock Option Plans Using Option Pricing Models," Journal of Accounting Research, vol. 14, No. 2, Autumm 1976, p. 362.
Options Clearing Corporation, "Characteristics and Risks of Standardized Options", Feb. 1994, pp. 19-21, 33.
Robert Geske, "The Pricing of Options with Stochastic Dividend Yield", The Journal of Finance, vol. 33, No. 2, May 1978, pp. 620-621.
Fischer Black et al., "The Pricing of Options and Corporate Liabilities", The Journal of Political Economy, vol. 81, No. 3, May-Jun. 1973, p. 639.
Clifford W. Smith et al., "Valuing Employee Stock Option Plans Using Option Pricing Models", Journal of Accounting Research, vol. 14, No. 2, Autumm 1976, p. 362.

*Primary Examiner* — Thomas M Hammond, III
(74) *Attorney, Agent, or Firm* — IM IP Law PLLC; C. Andrew Im (57) ABSTRACT

The present invention relates to an adjustable equity derivative and method for allocating distributions amongst different adjustable derivative components of a security upon a corporate event effecting the underlying equity in a manner that factor in the time value of money. The present invention uses the concepts of present and future values with respect to valuing equity derivatives in order to more fairly and accurately represent the interests of the various holders of such adjustable components upon the occurrence of a corporate event affecting the value of the adjustable equity derivatives.

13 Claims, 5 Drawing Sheets

ADJUSTABLE DERIVATIVE SECURITIES AND METHOD FOR ADJUSTING THE VALUE OF SAME DUE TO A CORPORATE EVENT

RELATED APPLICATION

The present application is a continuation-in-part application of U.S. application Ser. No. 10/154,742 filed May 24, 2002, which is incorporated herein by reference in its entirety.

BACKGROUND OF THE INVENTION

The financial industry created derivative securities (or derivatives) as a way to reallocate risk, create leverage, and provide a wider range of investment opportunities for its clients. These are securities whose prices are determined by, or "derive from," the prices of other securities. Popular examples of derivative securities include options and futures contracts. Standardized forms of these derivatives now regularly trade on various national and international exchanges. Because the value of derivatives depends on the value of the underlying securities, these can be powerful tools for hedging and speculation.

Option contracts, for example, are written on a variety of securities, such as common stock, stock indexes, foreign currency, agricultural commodities, precious metals, and interest rate futures. An investor may wish to purchase a call option, which allows the investor (option holder) to purchase the underlying security at a specified price (known as the exercise or strike price) during a fixed time period, if the investor believes the value of the underlying security will rise during that time period. For an American style option contract, if the price of the underlying stock rises above the strike price at any time during the fixed time period, the option holder may exercise his option to purchase the underlying common stock at the strike price and then immediately sell it at the market price. The option holder will only realize a profit if the difference between the market price and the strike price is greater than the original investment (premium) paid for the option contract. If the price of the underlying security does not rise above the strike price during the fixed time period, the option holder simply allows the option contract to expire, and his losses consist only of the premium paid for the option contract. A European option, in contrast, can only be exercised on the expiration date and would only be exercised if the stock is trading above the strike price on the expiration date.

An investor may also purchase a put option, which allows the option holder to sell the underlying security at a specified strike price during a fixed time period, if he believes that the value of the underlying security will drop during the fixed time period. For an American style option contract, if the price of the underlying security drops below the strike price at any time during the fixed time period, the option holder may exercise his option to sell the underlying security at the strike price. In order to exercise a put option, the option holder does not have to own the underlying security. Upon exercise, the investor's broker purchases the necessary shares of the underlying security at the market price and immediately delivers (or "puts" them) to an option writer for the strike price. The option holder will only realize a profit if the difference between the strike price and the market price of the underlying securities upon exercise is greater than the premium paid for the option. Again, if the price of the underlying security does not drop below the strike price during the fixed time period, the option holder can just allow the option contract to expire and lose no more than the premium paid for that option.

Conversely, the writers of call and put options generally sell these option contracts for a premium. They write options on the underlying securities for a variety of reasons. Security owners who feel bullish about their security may write a put option feeling that they can gain a premium of the option contract without risking much in return. Security owners may write a call option as a way of enforcing their sell disciplines. If an investor would sell their security if it reached a certain price in accordance with a disciplined investing strategy regardless of the surrounding circumstances, then such investors can write a call option to enforce that strategy and gain a premium in addition. Traditionally, equity options are created as contracts on 100 shares of the underlying stock. They are always created by purchasing an option, resulting in a long position, or writing an option, resulting in a short position. These are referred to as opening transactions. The option contracts are terminated by one of (a) letting the option expire, (b) exercising the contract, or (c) reversing the opening transaction in the market place. These are referred to as closing transactions.

The benefits associated with option contracts, which are only one form of derivative securities, are numerous. Investors can use them as hedging devices for minimizing risk. For example, an owner of a security may buy a put option on that security at a price that provides the investor with the comfort of knowing that he cannot lose more than a set amount of money for a specified time period. Investors can also enforce certain sell disciplines by writing call options as described above. Additionally, investors can speculate and leverage their stake in an underlying security through the purchase of call options in that underlying security as opposed to the purchase of the actual security. Combinations of the buying and selling of these simple option contracts provides a variety of products for the financial industry to offer its customers, appealing to the various investing strategies belonging to a wide range of customers.

There are two problems with the way such derivative securities are treated upon the occurrence of a corporate event affecting the underlying security during the time period in which the derivative securities are still in effect. The first is that these derivatives securities usually trade based on 100 shares of the underlying security for each derivative contract. This means that when there is a corporate event that changes the capital structure of the corporation, each derivative security contract must be changed to reflect the new structure. For example, a 3 shares for 2 shares stock split will result in each contract being based on 150 shares of the underlying stock. This can lead to confusion in the market place and a loss of liquidity for these option contracts.

The second problem with the current treatment of option contracts is that upon the occurrence of a corporate event, such as a liquidating distribution, the holder of the derivative security must exercise any rights at that time or allow the security to expire. For example, assume that a corporate event has triggered liquidation of the common stock of a Company XYZ, with full distribution rights upon liquidation. Regardless of the price of the stock upon liquidation, the holder of a call option (the "holder") must now decide whether to exercise his option to purchase the common stock at the strike price and sell at the liquidating price. Even if the holder makes a profit upon such an occurrence, the holder does not gain the true benefit of the bargain contemplated when he entered into the option contract. He loses the remaining time period in which the underlying common stock could have appreciated even further. The holder paid a premium to speculate on the underlying stock for a specified time period, and now that period is getting shortened without an adjustment for the loss of time, for which the holder has already paid. There is a need for a process that accounts for the value of time when the holder is forced to exercise his option contract before the specified time period has expired, or when any investor is forced to exercise a derivative security before the bargained for time period has come to an end.

OBJECTS AND SUMMARY OF THE INVENTION

The present invention relates to adjustable derivative securities and a method for providing investors in derivative securities the fair value of their investment upon the occurrence of an event related to the underlying security that forces such investors to exercise their derivatives before the time period allotted to the derivatives has expired. In accordance with an exemplary embodiment of the present invention, the time value of money is used to readjust the value of the derivative securities for the holder of the derivative security as well as the investor who has written the derivative security. The present invention further relates to adjustable contracts and a method for generating and adjusting option contracts that trade based on one share of the underlying stock. This allows the option contracts to be adjusted so as to maintain a one for one relationship to the underlying stock as a result of corporate events that change the capital structure of the underlying corporation.

In accordance with an exemplary embodiment of the present invention, upon the occurrence of a corporate event related to the underlying security, for which the derivative security's allotted time period prematurely expires, the exercise price of the derivative is readjusted to reflect the value of the time lost upon such premature expiration. The adjustment of the exercise price is based on a discount rate "r" selected to approximate the true time value of money. The discount or adjustment of the exercise price may equate to a raising or lowering of the price according to the nature of the derivative security. Any predetermined formula may be used to approximate the time value of money and discount the exercise price. A discounting formula, which is utilized in illustrative examples infra, is used to lower the exercise price according to its present value as follows:

$$PV = E/(1+r)^Y$$

PV is the new exercise price adjusted to reflect its present value; E is the old exercise price; r is the discount rate, which may be chosen to most accurately reflect the time value of money; and y is the time that remains after a premature expiration of the allotted time period for a derivative security, expressed in the same units as the discount rate. A related formula with the same variables, also utilized in illustrative examples herein, is used to raise the exercise price to its future value as follows:

$$FV = E*(1+r)^y$$

In accordance with an exemplary embodiment of the present invention, factors other than the exercise price of the derivative may be adjusted, upon an event that causes premature expiration, to provide the holder and writer of such derivative with a fairer distribution of the underlying asset. One such factor is an income or dividend component of the security, which may be adjusted by taking the present value of the remaining nominal dividends at the discount rate as follows:

$$PV = \sum_{i=1}^{N} D_i / (1+r)_i^y$$

This time PV would be the present value of the stream of income; N is the number of remaining payments; $D_i$ is the stream of income or dividend payments; again r is the discount rate; and the $y_i$ are the times to each of the $D_i$ dividend payments in the future.

It is an object of the present invention to properly allocate gains and losses on investments in derivative securities upon the occurrence of corporate events related to the underlying securities, which cause the allotted time period for such derivatives to prematurely expire.

It is also an object of the present invention to adjust the value of one or more components of securities upon their premature expiration to reflect the value of the time lost.

It is another object of the present invention to utilize the concept of present value to properly discount one or more components of securities upon their premature expiration to reflect the value of the time lost.

It is a further object of the present invention to properly adjust the number and value of one or more components of securities upon a corporate event related to the underlying securities to properly reflect such event.

It is still a further object of the present invention to utilize the concept of present value in properly adjusting the number and value of one or more components of securities upon a corporate event relating to the underlying security to properly reflect such event.

Various other objects, advantages, and features of the present invention will become readily apparent from the ensuing detailed description, and the novel features will be particularly pointed out in the appended claims.

BRIEF DESCRIPTION OF THE FIGURES

The following detailed description, given by way of example, and not intended to limit the present invention solely thereto, will best be understood in conjunction with the accompanying drawings in which.

DETAILED DESCRIPTION OF THE EMBODIMENTS

Before referring to the drawings in detail, it will be understood that for the purposes of this invention, the terms derivatives, derivative securities, derivative security components, derivative components, and components may all be used interchangeably. It will also be understood that while the examples herein disclose contracts having a five year time period and settling in stock with European style expiration, the present invention will apply to contracts of longer or shorter time and can settle in stock or cash and have European or American style expiration. It will also be understood that the term components, derivative components, or derivative security components can be used to describe the scenario where more than one security derives from an underlying equity, resulting in two or more derivative securities representing components of the underlying equity.

According to an embodiment of the present invention, upon the occurrence of a corporate event, several financial organizations coordinate the notification of the event to the appropriate parties, the processing, and valuation of the derivative securities at issue, and the reporting of such valuations. These financial organizations include Depository Trust Corporation ("DTC"), a Clearing Corporation ("CC"), and Americus Derivatives Corporation ("ADC"). They accomplish these tasks in two series of events, one taking place on the date that the corporate event is announced, and the other taking place on the actual date that the corporate event takes effect.

Figure 1:
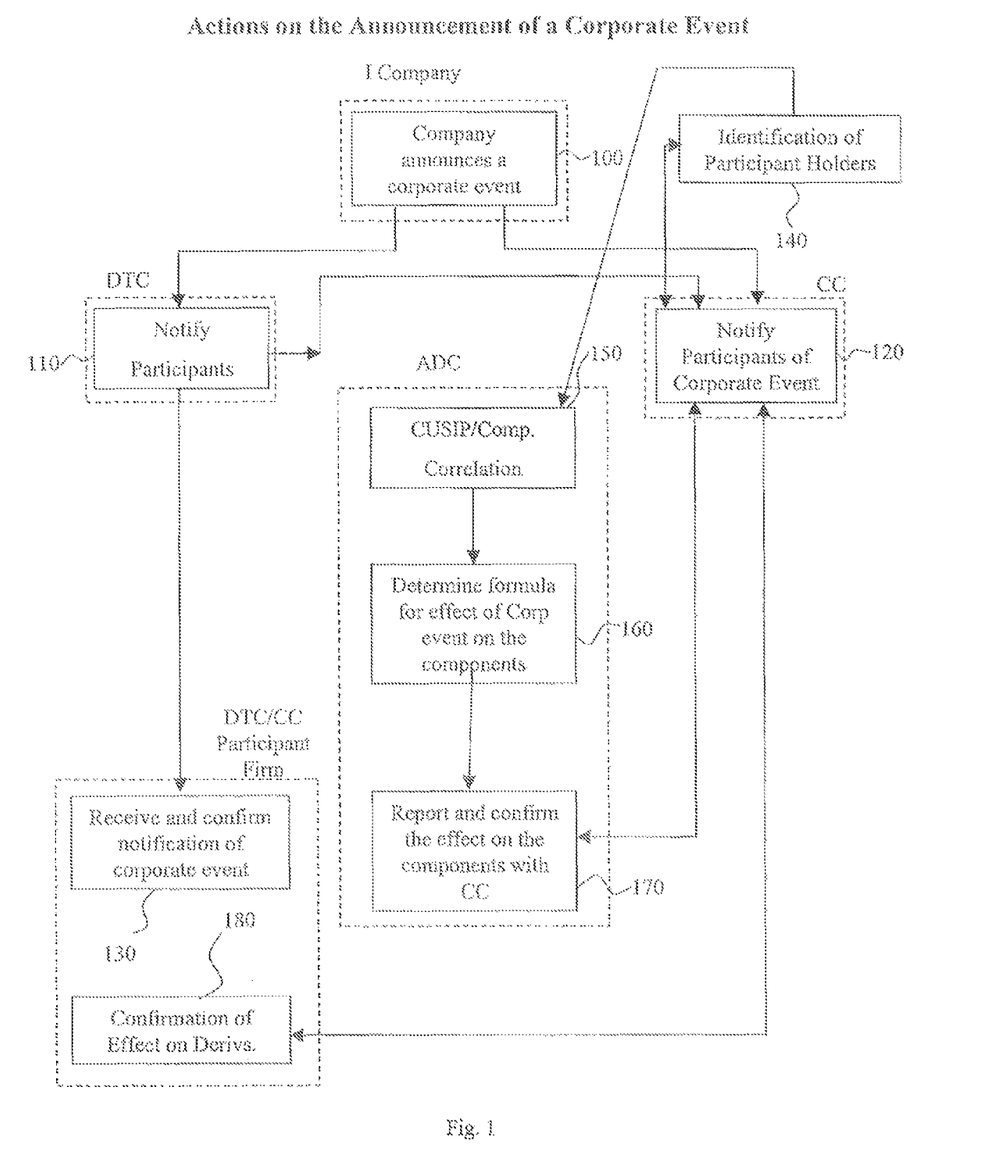
FIG. 1 is a flow chart illustrating the activities undertaken upon the announcement of a corporate event.

As illustrated in FIG. 1, a company initiates the whole process by announcing a corporate event in step 100. The company notifies participant members of DTC, which, on behalf of participant members, may serve as the repository for the company's equity, in step 110. DTC then notifies (i) CC, which maintains records that identify all member firm holders of the relevant derivative securities, in step 120; and (ii) DTC/CC participant firm, which can identify customer holdings, reconcile such holdings to ADC, and notify customers and the company of relevant information, in step 130. As set forth in commonly owned U.S. Pat. Nos. 5,671,358 and 5,758,097, the present invention can be implemented using computers at the DTC, ADC, CC and DT/CC participant firm. The company's computer communicates with the DTC's computer to announce the corporate event in step 100. As it learns of the corporate event, the DTC's computer disseminates this information to its participants in step 110. The DTC's computer then notifies the CC's computer and DTC/CC participant firm's computer in step 120. The DTC/CC participant's computer identifies customer holdings, reconciles such holdings to ADC's computer, and notifies customers and the company computer's of relevant information in step 130.

ADC requests from CC, information that identifies member firm holders of record of the derivative securities pertinent to a derivative security valuation, and CC responds with the pertinent information in step 140. That is, the ADC's computer sends a request to the CC's computer for information identifying member firm holders of record of the derivative securities pertinent to a derivative security valuation, and CC's computer responds with the pertinent information in step 140. ADC then performs three tasks in order to establish the valuation of the various derivative securities for the eligible holders of such derivative securities:

1. The CUSIP correlation computer means of the ADC's computer performs a Committee on Uniform Securities Identification Procedures ("CUSIP") correlation for correlating the equity at issue with the various derivative securities related to such equity, such as dividend value of stock (DIVS®, option with limited stock (OWLS®) and residual interest in stock (RISKS®), using the CUSIP component data from a CUSIP file or memory storage means in step 150;
2. The ADC's computer determines any needed formulas for calculating the effect of the corporate event on the various derivative securities in step 160; and
3. The ADC's computer reports and confirms the effect on the derivative securities with the CC's computer in step 170.

The CC's computer then reports and confirms the effect on the derivative securities with DTC/CC participant firm's computer in step 180.

Figure 2:
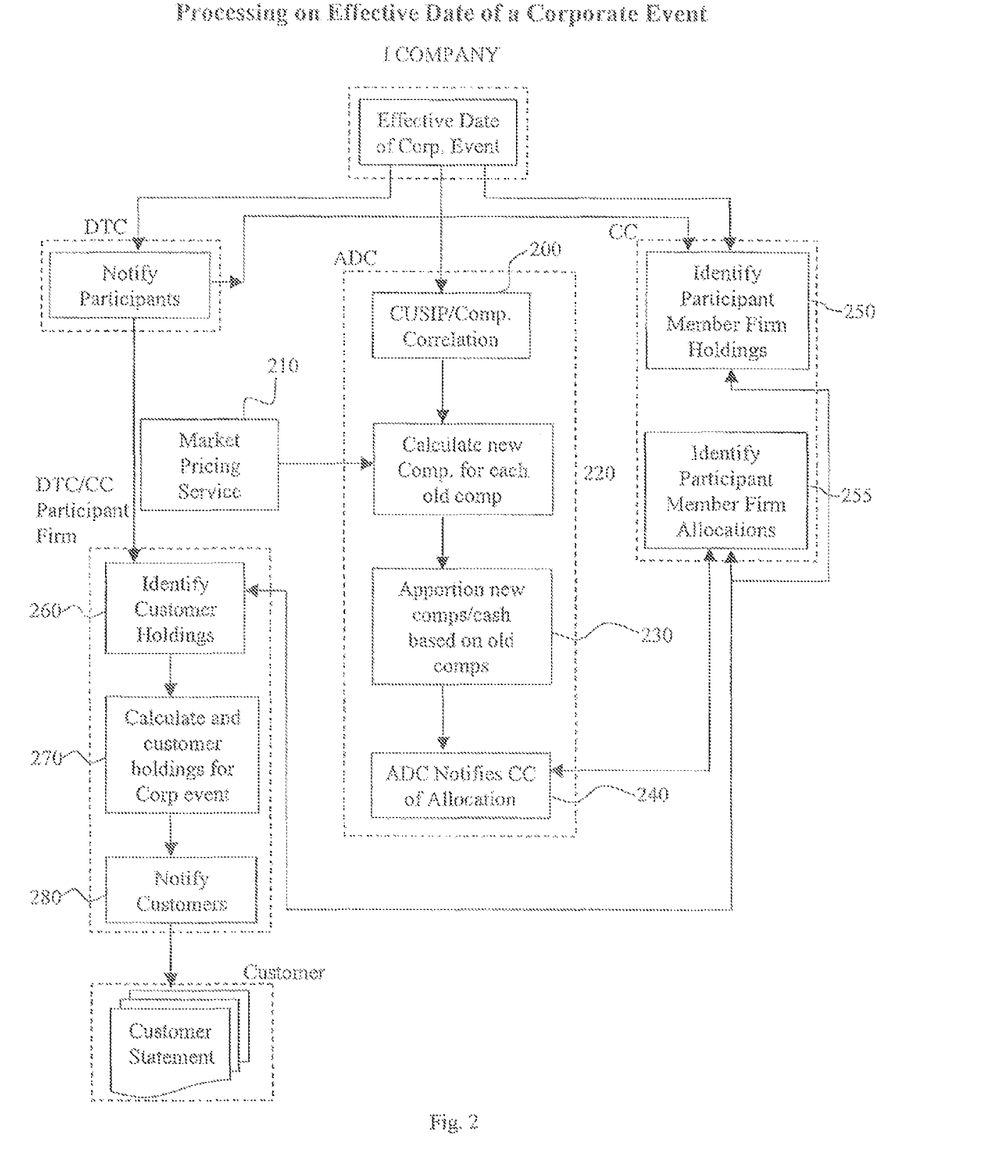
FIG. 2 is a flow chart illustrating the activities on the effective day of the corporate event.

The second part of this process is executed on the effective date of the corporate event as illustrated in FIG. 2. On the effective date, the CUSIP correlation computer means of the ADC's computer performs a CUSIP correlation computation using the CUSIP component data from a CUSIP file or memory storage means, correlating the equity at issue with the relevant derivative securities in step 200. The ADC's computer then receives pricing information from a Market Pricing Service computer in step 210, and uses that pricing information along with the formulas previously determined in step 160 (FIG. 1) to compute and store new time adjusted values for the relevant derivative securities in a computer file or storage disk in step 220. It is hereby appreciated that the pricing information used in computing new time adjusted values may be the market price of the derivative on the effective date of the corporate event, or an average of the market price over a specified period of time prior to the effective date of the corporate event, or any other predetermined price or pricing formula. The vote apportioning computer means of the ADC's computer then allocates and stores values to the relevant derivative securities based on the time adjusted valuations in the computer file or storage disk in step 230. The ADC's computer notifies the CC's computer of the adjusted valuations in step 240, where the CC's computer adjusts the positions of its member firms to reflect the adjustments made by the ADC's computer. The CC's computer then transmits this adjustment information to the member firms' computer in steps 250 and 255, who then identify customer holdings in step 260, adjust the customer holdings accordingly in step 270, and notify the customers through a customer statement in step 280.

This invention relates to the process undertaken by ADC in the above examples, or similar financial organizations, in adjusting the effected derivative securities upon the occurrence of a corporate event. This invention provides ADC, or any like organization which processes derivatives, a process for computing the adjustments to such components, which factors in the time value of money.

Figure 3:
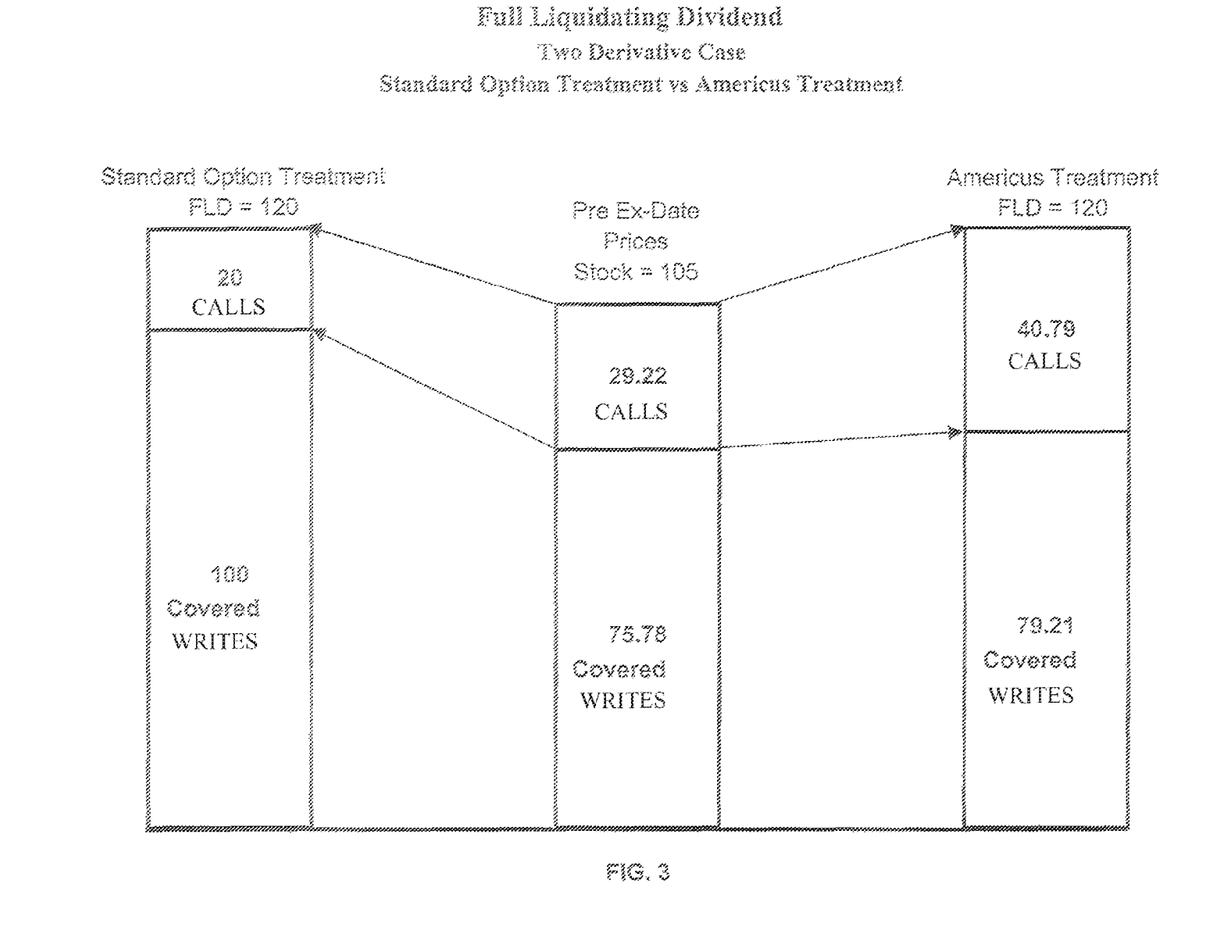
FIG. 3 is a chart illustrating an embodiment of the inventive process which allocates funds to the different derivatives of a security upon a corporate event triggering a full liquidation.

In accordance with an exemplary embodiment of the present invention as illustrated in FIG. 3 and Table 1, the derivative security comprises an American Style call option on a 100 shares of common voting stock in a blue chip corporation (XYZ) with a five (5) year fixed time period, which will be assumed to equate to 1825 days for the purposes of the calculations for this example. The holder of the option can exercise or call the option at any time during this time period. The holder paid $29.22 per share for this option with a strike price of $100, meaning that the investor can purchase the 100 shares of XYZ at the price of $100 per share at any time during the allotted five year time period. One (1) year or 365 days into the allotted one year time period, company ABC makes an offer to purchase XYZ at a price of one-hundred and twenty dollars ($120) per share. XYZ's board accepts and proceeds with a full liquidation of the stock, paying the shareholders $120 for each share of stock that they own.

TABLE 1

FULL LIQUIDATING DIVIDEND

Assumed Stock Parameters

| | | | |
|---|---|---|---|
| Dividend | $ 0.00 | Stock Price | $105.00 |
| Days to Term | 1460 | CALLS Price | 29.22 |
| Years to Term | 4 | Covered WRITES Price | 75.78 |
| Termination Claim | $ 100.00 | | |
| Standard Deviation | 16% | | |
| Risk Free Rate | 6% | | |

1. The Termination Claim is adjusted by taking the present value of the original TC discounted at the risk free rate from the termination date to the present.
2. Payment to the Covered Writes is the lesser of the adjusted TC or the liquidating dividend.
3. The CALLS receive any money left after the OWLS are paid.

| | |
|---|---|
| Adj. Term Claim | 79.21 PV of the Termination Claim discounted at the risk free rate 79.21 = 100/[(1 + .06)^4] |

CALL option price comparison For a Full Liquidating Dividend

| | Initial Price | Standard Option Treatment | Americus Treatment |
|---|---|---|---|
| CALL Option | $29.22 | $ 20.00 | $40.70 |
| Price Change | | −9.22 | 11.57 |
| Percent Change | | −31.56% | 39.58% |

According to the current known process for the handling of options in a full liquidation scenario, the option holder would call his option, purchasing the stock at $100 and then immediately selling that stock for $120. The option holder would realize a loss of $9.22 per share, or $922 for the 100 shares, as he would gain $20 per share in proceeds after paying $29.22 per share for the call option. This example illustrates the problem existing in the current treatment of derivative securities. The option holder paid the $29.22 per share in order to speculate on the underlying stock over a five (5) year period. Unfortunately for the option holder, a corporate event has curtailed this period of speculation by four (4) years or 1,460 days. The option holder has not received the true benefit of his bargain.

The present invention changes the process of distribution in such a scenario to factor in the value of the remaining time period. In accordance with an exemplary embodiment of the present invention as illustrated in FIG. 3 and Table 1, the exercise or strike price of the XYZ option is discounted to provide the option holder with a distribution that reflects the value of the 1,460 lost days of speculation. Any discounting formula may be used to factor in the 1,460 lost days. In Table 1, the strike price is discounted with the following formula:

$$S=E/(1+r)^y$$

S is the new discounted strike price; for the purposes of this example assume that E, the original strike price, is $100, and r, the risk free rate of interest, is 6%, and y, the remaining period of time on the option contract, is 1460/365 or 4. According to this discount formula the new strike price, $S=100/(1.06)^4=\$79.21$. According to the readjusted strike price, S, the option holder now gains proceeds equal to the difference between $120 and $79.21, or $40.79 per share, which is $20.79 per share more than the proceeds obtained using the standard treatment of options. These proceeds result in a profit of $40.79−$29.22 per share, or $11.57 per share, or $1,157 for the 100 shares. The inventive treatment of this derivative provides the option holder with a return on his investment of 39.58% as opposed to the 31.5% loss of capital experienced with the standard derivative treatment. While the holder of the call option realizes more profit, the writer or seller of the option receives less money for his shares of XYZ stock. The option writer or seller now only receives $79.21 per share of XYZ stock, which is $20.79 less than the amount he would have received using the standard treatment of option contracts in this scenario. Assuming that the risk free rate of interest is 6%, the option writer or seller, however, could invest his money in short term treasury bonds with the same risk free rate and recoup the full $100 in 1460 days, which is the remaining term of the option contract.

Figure 4:
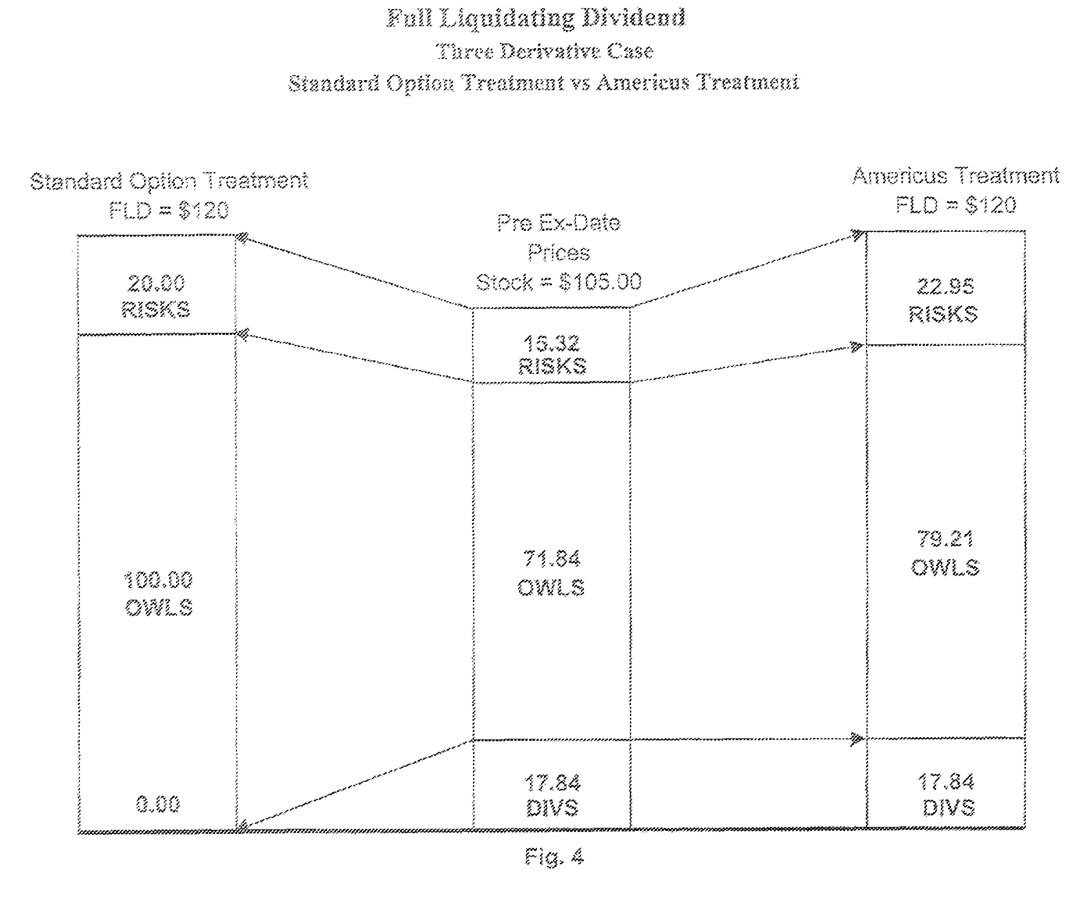
FIG. 4 is a chart illustrating an embodiment of the inventive process which allocates funds to the different components of a three part derivative security upon a corporate event triggering a full liquidation.

In accordance with an exemplary embodiment of the present invention as illustrated in FIG. 4 and Table 2, the inventive method is applied to a different type of derivative security. The adjustable derivative security is still based on the underlying common stock of XYZ corporation. The adjustable derivative, however, is divided into three adjustable components: The adjustable DIVS component represents the stream of dividends distributed to the holders of each share of XYZ. The adjustable RISKS component represents the speculation on future gains on the value of each share of XYZ, which is similar, but not identical, to a call option on XYZ stock; and the adjustable OWLS component represents the nucleus of a share of XYZ stock, absent the dividend and speculative components of that stock, which is similar but not identical to holding XYZ stock after writing a call option on that stock. Strictly speaking, the adjustable OWLS is similar to holding the stock and writing calls on the appreciation and the dividend. It is appreciated that all adjustable OWLS and RISKS can be settled in cash or securities depending on the contract. The concepts and terminology associated with these three component derivatives are fully set forth in commonly owned U.S. Pat. Nos. 5,671,358 and 5,758,097, which are incorporated by reference herein in their entirety.

In accordance with this exemplary embodiment of the present invention, investors may purchase one or more of the three adjustable derivatives representing the different components as European Style, five (5) year derivative contracts, meaning that the derivative would have a five year term and it can only be exercised at the end of this 5 year period. The three adjustable derivatives may not be exercised during the 5 year period, but may be freely traded throughout that time period. It is anticipated that the combination of the adjustable derivatives would closely approximate the market price of the underlying stock at any time.

The writer of the adjustable DIVS would pay the holder of this derivative the dividends that are distributed on the underlying stock throughout the 5 year period. The value and price of this derivative will approach zero (0) by the end of the 5 year term. The price of the adjustable DIVS derivative is always based on the expected remaining dividend distribution for the XYZ stock for that 5 year term.

The writer of the adjustable RISKS would deliver to the holder of this derivative, at the end of the 5 year term, stock or cash worth the amount that the price of XYZ stock at the time is above the termination claim, which is similar but not identical to a strike price. This would represent a settlement of differences between the termination claim and the current market price of the stock at termination. The contract would state whether the settlement of the differences is paid in cash or securities. If at the end of 5 years, shares of XYZ are trading at or below the termination claim, then the holder of the adjustable RISKS derivative receives nothing. If, however, the price of XYZ stock is trading above the termination claim at the end of the five year period, the holder of the adjustable RISKS derivative receives the difference between the market price of XYZ stock and the termination claim. The termination claim is set at the beginning of the 5 year period, and the adjustable RISKS derivative is priced accordingly. Throughout the five year period, the adjustable RISKS derivative is priced similar to a call option.

The adjustable OWLS derivative is what remains of a share of XYZ stock after the adjustable DIVS and adjustable RISKS have been removed. The holder of this derivative at the end of the 5 year period receives the price of the underlying XYZ share up to the termination claim. If the market price of XYZ shares at the end of the 5 year period is equal to or greater than the termination claim, then the holder of this derivative is paid an amount equal to the termination claim. If XYZ's market price is below the termination claim at the end of the 5 year period, then the holder of the adjustable OWLS derivative received the full price of the stock.

It is appreciated that common stock can be further divided into four (4) or more components trading as adjustable derivative securities. For example, in addition to the adjustable RISKS and DIVS, the OWLS derivatives can be further subdivided into levels of appreciation with different termination claims. The adjustable OWLS derivative described above can be subdivided into adjustable OWLS1 with a termination claim of $50, adjustable OWLS2 with a termination claim of $75, and adjustable OWLS3 with a termination claim of $100. Once the 5 year period is over, the holders of (i) adjustable OWLS1 would receive the market price of XYZ up to the $50 termination claim; (ii) adjustable OWLS2 would receive any appreciation of XYZ common stock over $50 up to the $75 termination claim; and (iii) adjustable OWLS3 would receive any appreciation of XYZ common stock over $75 up to the $100 termination claim. The market would price these derivatives according to the relative risk of the derivative security with the adjustable OWLS1 being the least risky of the adjustable OWLS derivatives and OWLS3 being the most risky of the adjustable OWLS derivatives. The concepts described herein for the three adjustable component derivative securities can just as easily be applied to four or more adjustable components.

A corporate event, such as the sale of XYZ, triggers a full liquidating dividend of XYZ shares prior to the expiration of the 5 year period for the holders of the adjustable DIVS, RISKS, and OWLS. The sale occurs 365 days into the 5 year term (assuming 365 days in a year for simplicity of calculations) leaving 1460 days (4.0 years) on the term of the adjustable DIVS, RISKS, and OWLS. For the purposes of this example, assume that the termination claim (TC) was set at $100, the risk free rate, r, is 6.00%, and the annual dividend is $5. Under a standard-like option treatment, the DIVS holders would receive nothing from such a distribution. Additionally, the RISKS holders would not get the benefit of the full five year period to allow the stock to appreciate as they had anticipated. The OWLS would benefit unfairly as they would receive the full benefit of their bargain without having to await the full 5 year term. If the liquidating dividend was $120, the three components would receive the following distributions: DIVS holders would receive $0, RISKS holders would receive $20, and the OWLS holders would receive $100. That is, the termination claim is not adjusted to reflect the lost period of time for the adjustable RISKS holders and the adjustable DIVS simple lose their stream of income.

In accordance with an exemplary embodiment of the present invention as illustrated in FIG. 4 and Table 2, a full liquidating dividend would result in the following distributions that account for the time value of money: First, the adjustable DIVS holder would receive the present value of the remaining expected nominal dividend payments, which, for this example, is equal to $17.84. Second, the termination claim is discounted to represent its present value considering that there are 4.0 years remaining on the term of the derivatives. Using the 6.00% risk free rate, the original TC of $100 is reset to its present value of $79.21. Accordingly, holders of the adjustable OWLS derivative receive $79.21 per share. Finally, the holders of the adjustable RISKS derivative receive all of the remaining distribution, which for this example is $22.95 per share.

TABLE 2

FULL LIQUIDATING DIVIDEND
(trading in OWLS, RISKS and DIVS)

Assumed Stock Parameters and Component Prices

| Dividend | $ 0.00 | Stock Price | $105.00 |
|---|---|---|---|
| Days to Term | 1460 | CALLS Price | 29.22 |
| Years to Term | 4 | Covered WRITES Price | 75.78 |
| Termination Claim | $ 100.00 | | |
| Standard Deviation | 16% | | |
| Risk Free Rate | 6% | | |

1. The DIVS receives the present value of the remaining nominal dividends discounting at the risk free rate.
2. The Termination Claim is adjusted by taking the present value of the original TC discounted at the risk free rate.
3. Payment to the OWLS is the lesser of the adjusted TC or the liquidating dividend reduced by the amount paid to the DIVS.
4. The RISKS receives any money left after the OWLS and DFVS are paid.

| DIVS Payment | $17.84 | Present Value of the expected future dividends discounted at the risk free rate |
|---|---|---|
| Adjusted Term Claim | $79.21 | PV of the Termination Claim discounted at the risk free rate 79.21 = 100/[(1 + .06) 4] |

| Liquidating Dividend | $120.00 | $130.00 | $140.00 | $150.00 |
|---|---|---|---|---|
| Value of DIVS | 17.84 | 17.84 | 17.84 | 17.84 |
| Liq Div less DIVS | 102.16 | 112.16 | 122.16 | 132.16 |
| Value of OWLS | 79.21 | 79.21 | 79.21 | 79.21 |
| Value of RISKS | 22.95 | 32.95 | 42.95 | 52.95 |

Figure 5:
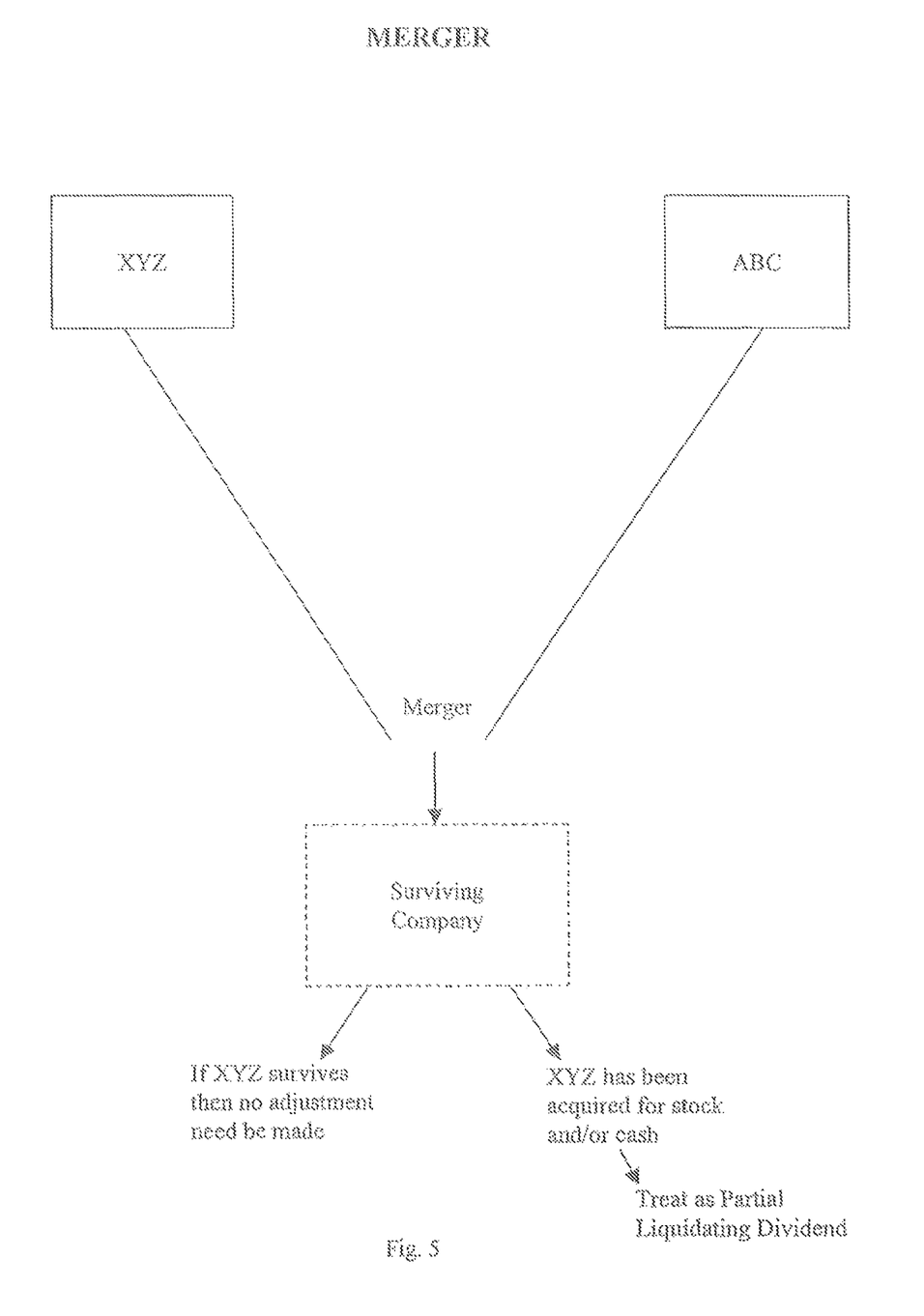
FIG. 5 is a chart illustrating an embodiment of the inventive process which allocates funds to the different components of a three part derivative security upon a corporate event triggering a merger.

In accordance with an exemplary embodiment of the present invention as illustrated in FIG. 5 and Table 3, XYZ corporation participates in a merger with ABC corporation. If XYZ is the surviving corporation, then no distributions are made and no adjustments need to be made to the adjustable derivative securities based on the stock of XYZ corporation. If the XYZ is not the surviving company, then a few options arise. One example is that no distributions are made, and the surviving companies stock simply replaces the common stock as the underlying assets for the adjustable derivatives. Another example involves the acquisition of XYZ for stock and cash. For this latter example, the adjustable derivatives will be adjusted as for a partial liquidating dividend as discussed in relation to Table 5 herein, with the remaining stock underlying the adjustable DIVS, OWLS and RISKS until the end of the contract period, i.e., 5 years.

TABLE 3

MERGERS
(trading in OWLS, RISKS and DIVS)

1. If the surviving company is the issuer of the components, no adjustments for the DIVS, OWLS and RISKS will be made.
2. If the issuer is not the surviving company, the stock of the acquiring company will underly the components.
3. If the original company is acquired for stock and cash, the components will be adjusted as for a partial liquidating dividend.
4. The DIVS holder will receive the dividends paid by the company after the merger.

In accordance with an exemplary embodiment of the present invention as illustrated in Table 4, XYZ issues a special dividend, which is not part of the stream of dividends anticipated by the holders of XYZ common stock. XYZ, whose shares at the time are trading on the market at $105/share, issues a special dividend of $10.00 with 1460 days remaining in the term of the derivatives.

TABLE 4

SPECIAL DIVIDEND
(trading in OWLS, RISKS and DIVS)

1. The DIVS receives a portion of any special dividend representing up to 3%, or a percentage specified in the contract, of the stock's price on the ex-date of the special dividend.
2. The OWLS receives any remaining portion of the special dividend.
3. The value of the special dividend, reduced by the payment to the DIVS, is adjusted to be its future value based on the maximum potential IRR of the OWLS.
4. The Termination Claim is reduced by the future value from 3.

| | | |
|---|---|---|
| Special Dividend | $10.00 | |
| DIVS Payment | $ 3.15 | Based on the amount of the special dividend and 3.0% of the stock's price 3.15 = 105 * .030 |
| Payment to OWLS | $ 6.85 | Portion of the special dividend payable to OWLS 6.85 = 10.00 − 3.15 |
| OWLS IRR | 8.62% | Expected IRR of the OWLS to the Termination Claim 8.62% = Annualized IRR from 71.84 to 100 over 1460 days |
| Future Value of Dividend | $ 9.53 | Future Value of the SD, reduced by the DIVS payment, based on the IRR of the OWLS to the Termination Claim 9.53 = (10.00 − 3.15)*(1 + 0.0862) (1460/365) |
| Adjusted Term Claim | $90.47 | Term Claim reduced by the future value of the special dividend. This value is used to determine the payout to the OWLS and RISKS on the termination date 90.47 = 100.00 − 9.53 |

Expected Ex-date Values as the Result of a Special Dividend

| | | |
|---|---|---|
| Stock | $95.00 | Stock price reduced by the special dividend |
| RISKS | 12.72 | Calculated (Black & Scholes) using $95 stock price, 90.47 adjusted Termination Claim and $5.00 dividend |
| DIVS | 17.84 | PV of 4 years of nominal dividends ($5.00) discounted at the risk free rate |
| OWLS | 64.44 | Residual value based on the new stock, RISKS and DIVS |
| OWLS IRR | 10.19% | OWLS IRR going from 64.44 to 90.47 in 1460 days |

Again, one possible treatment of special dividends would result in the following distributions: the adjustable DIVS and RISKS holders would receive $0 from this distribution, the adjustable OWLS holders would receive the full $10/share, and the termination claim would remain unchanged. In an alternative treatment, the adjustable DIVS holder receives the entire special dividend.

In accordance with an exemplary embodiment of the present invention as illustrated in Table 4, the distributions are made to the adjustable derivative holders in the context of the time value of money. Assume for the purposes of this example that the termination claim was set at $100, the adjustable OWLS derivative is currently trading at $71.84, and the annualized internal rate of return (IRR) for this derivative equal to 8.62%. The annualized IRR is the rate of return needed for an investment of $71.84 to reach the termination claim of $100, which is what the adjustable OWLS expect to receive, in the remaining 1460 days. The adjustable DIVS holder receives the portion of the special dividend representing a specified percentage of the current market price of the underlying equity security. This percentage may be determined by several methods, including, but not limited to the following: ADC may set the percentage prior to the issuance of the adjustable DIVS; ADC may set it upon the issuance of the special dividend; a special committee within the corporation may be in charge of setting it; it may be the function of another variable such as the risk free rate of return; it may be standardized by the financial industry. In this example, assume that the adjustable DIVS receive a distribution from the special dividend up to 3% of the stock's price, which in this case is $105*0.03 or $3.15. If the special dividend is less than 3% of the stock's price, then only the adjustable DIVS holder participates in the distribution and no other adjustments need be made. In this example, the special dividend is $10.00, so the adjustable DIVS holder gets a $3.15/share distribution, and there remains $6.85 to be distributed. The adjustable OWLS holder receives the remainder of the special dividend, in this case $6.85. The termination claim would then be adjusted to reflect the current $6.85 distribution to the adjustable OWLS holders. The termination claim can be adjusted by reducing it by the future value of the $6.85 distribution using the 8.62 annualized IRR for the adjustable OWLS derivative, which equals $6.85*(1+0.0862)$^{4.0}$ or $9.53. The termination claim is reduced to $100−$9.53 or $90.47 to fairly reflect the future value of the current distribution to the adjustable OWLS holders, which acts like an early withdrawal of their initial investment for the adjustable OWLS holders. The adjustable RISKS holders are no longer penalized upon XYZ's distribution of special dividends, allowing them to recoup the loss of capital to the corporation, which is likely to be reflected in a lower stock price, through a properly reduced termination claim.

In accordance with an exemplary embodiment of the present invention as illustrated in Table 5, XYZ corporation issues a partial liquidating dividend (PLD). First, the adjustable DIVS holders will receive the present value of any reduction in the dividends paid on the underlying stock. The PLD will then be adjusted by deducting any payments to the adjustable DIVS holders. The adjusted PLD will be denoted as $PLD_n$. Then the present value of the termination claim (TC) is compared to the $PLD_n$. If the present value of the TC is greater than the $PLD_n$, then (i) the TC is adjusted by deducting from it the future value of the $PLD_n$, which is based on the potential IRR of the current market price of the adjustable OWLS needed to reach the TC upon expiration of the derivative; and (ii) the adjustable OWLS holders are paid the full $PLD_n$. If, however, the $PLD_n$ is greater than or equal to the present value of the termination claim, then (i) the adjustable OWLS holders get paid the present value of the termination claim, meaning that they have been paid on their investment and no longer have an interest in the underlying asset; (ii) the termination claim is adjusted to zero; (iii) the adjustable RISKS holders get paid the remainder of the $PLD_n$, which is the $PLD_n$, reduced by the present value of the TC; and (iv) any future liquidating dividends are paid to the adjustable RISKS and DIVS holders.

via a reduction of $5.35, leaving a $PLD_n$ of $34.65. This value is then be compared with the present value of the TC, which is equal to $100/(1.06)^{4.0}$ or $79.21. As the TC of $79.21 is greater than the $PLD_n$ of $34.65, the adjustable OWLS holders receive the full adjusted partial liquidation distribution of $34.65. In addition, the TC must be adjusted by a deduction of the future value of the $PLD_n$ based on the OWLS IRR of 8.62%. The future value of the $PLD_n$ is equal to $34.65*(1.0862)^{4.0}$ or $55.68, and the adjusted TC should now be $44.32. Hence, at the end of the five year period, if the stock price is trading at any price above $44.32, that excess will belong to the adjustable RISKS holders while the adjustable

TABLE 5

PARTIAL LIQUIDATING DIVIDEND
(trading in OWLS, RISKS and DIVS)

1. DIVS will receive the present value of the reduction, if any, in the dividend paid on the underlying stock.
2. Adjusted PLD (PLDn) = PLD reduced by the payment to the DIVS
3. If the PLDn is less than the present value of the Termination Claim
    i. Adj. TC equals the original TC reduced by the future value of the PLDn based on t the potential IRR of the OWLS to the TC
    ii. The OWLS are paid the adjusted PLD.
4. If the PLDn is greater than or equal to the present value of the termination claim.
    i. The OWLS get paid the present value of the termination claim.
    ii. The Termination Claim is adjusted to zero.
    iii. The RISKS get the remaining portion of the adjusted PLD (PLDn – PV(TC)).
    iv. Any future liquidating dividends will be paid to the RISKS and DIVS, the OWLS having been completely paid.

| | | |
|---|---|---|
| Value of PLD | $40.00 | |
| New Stock Dividend | $ 3.50 | Announced by the company |
| Reduction in Dividend | $ 1.50 | 1.50 = 5.00 – 3.50, the reduction in the annual dividend due to the PLD |
| PV of the Term Claim | 79.21 | PV of the Termination Claim discounted at the risk free rate 79.21 = 100/[(1 + .06)^4] |
| Payment to DIVS | $ 5.35 | 5.35 = PV of 1.50 for 4 years discounted at 6.0% |
| Payment to OWLS | $34.65 | Portion of PLD due to the OWLS to make up for the decrease in the Termination Claim 34.65 = 40.00 – 5.35 |
| OWLS IRR | 8.62% | OWLS IRR before the PLD |
| Adjusted PLD Termination | 55.68 | Future value of the PLD using the OWLS IRR to the Claim |
| Adjusted Term Claim | 44.32 | Termination Claim reduced by the future value of the PLD. This value is used to determine the payout to the RISKS OWLS at the termination date. 44.32 = 100 – 55.68 |

Expected Ex-date Values as a Result of a Partial Liquidating Dividend

| | | |
|---|---|---|
| Stock | $65.00 | Pre ex-date stock price reduced by the amount of the PLD |
| RISKS | 20.68 | Black & Scholes RISKS price using $65.00 stock price, $44.32 adjusted Termination Claim and the $3.50 new dividend |
| DIVS | 12.49 | PV of 4 years of $3.50 annual nominal dividends discounted at the risk free rate |
| OWLS | 31.83 | New residual value of the OWLS |
| OWLS IRR | 8.63% | OWLS IRR going from 31.83 to 44.32 in 4 years |

In accordance with an exemplary embodiment of the present invention as illustrated in Table 5, with 1460 days (4.0 years) left in the term of the adjustable derivatives, XYZ issues a PLD of $40.00. The annual dividend was decreased from $5 to $3.50 over the last 4.0 years. As in previous embodiments, the TC is $100 and the risk free rate of return is 6.00%. Under one possible distribution, the adjustable DIVS and RISKS holders would have received $0 while the adjustable OWLS holders would have received the full $40/share and the termination claim would have been reduced by $40 (TC=$100–$40=$60).

In accordance with an exemplary embodiment of the present invention as illustrated in Table 5, the PLD would have resulted in the following distributions and adjustments to the adjustable derivatives. First, the adjustable DIVS holders would have received a payment of $5.35 per share, which is the present value of the $1.50 loss in the annual dividend for the next 4.0 years, to make up for the decrease in dividend payments resulting from this PLD. The PLD is then adjusted OWLS holders would only receive $44.32 per share at that time, offsetting their current $34.65 distribution.

In accordance with an exemplary embodiment of the present invention as illustrated in Table 6, XYZ spins-off another company ABC. Upon such an occurrence, the adjustable derivatives are now backed by a combination of both XYZ (hereinafter referred to as "XYZ'") and ABC share). XYZ shares have been spun-off so that there is a ¼ share of ABC for every share of XYZ'. Accordingly an adjustable derivatives contract backed by 100 shares of XYZ is now backed by 100 shares of XYZ' and 25 shares of ABC. After the spin-off, the XYZ' shares trade at a market price of $87.50 while the ABC shares trade at a market price of $50. Relative to overall dollar value, the derivatives are now backed by 87.5% XYZ' shares, (100 sh*$87.50)/(100 sh*$87.50+25 sh*$50), and 12.5% ABC shares, (25 sh*$50)/(100 sh*$87.50+25 sh*$50).

TABLE 6

SPIN-OFFS AND SPLIT-UPS
(trading in OWLS, RISKS and DIVS)

1. The RISKS, OWLS and DIVS contracts will be backed by the shares of the original company and the spun-off company.
2. Assuming each original contract were for 100 shares, the adjusted contract will be for 100 shares of the spinning company and 100 times the number of shares of the spun-off for each original contract.
3. The DIVS will receive the dividend paid on the new companies times the number of shares of each distributed per contract.
4. At termination the value of the underlying shares will be computed as the price of each times the number of shares of each per contract.
5. The dollar value of stock each component receives will be calculated as in a normal termination, based on the termination claim and the combined value calculated in 4. RISKS receive nothing if the combined value from 4 is below the TC.
6. The number of share of each company the OWLS and RISKS receive will be the percentage value or that each component represents of the combined value from 5, times the number of shares each company represents in the contract.

|  | Original Company | Post Spin-off Co. 1 | Post Spin-off Co. 2 | Assume ¼ share of company 2 for each original share and the TC is $100 |
|---|---|---|---|---|
| On Effective Date: | | | | |
| Shares/contract | 100 | 100 | 25 | |
| Price/share | $ 100.00 | $ 87.50 | $ 50.00 | 100 = 1.00*87.5 + .25*50.0 |
| Value/contract | $10,000 | $ 8,750 | $1,250 | share price times shares/contract |
| Relative value | 100.00% | 87.50% | 12.50% | The fraction that each company represents of the original company |
| Dividend/share | $ 5.00 | $ 4.00 | $ 4.00 | Announced by companies |
| Dividend/contract | $ 500.00 | $ 400.00 | $ 100.00 | Dividend times number of shares per contract |
| On Termination Date: | | | | |
| Value/share | $ 135.00 | $ 110.00 | $ 100.00 | Assumed prices for companies 1 & 2, and combined contract value. 135 = 1.00 * 110 + .25 *100 |
| Value/contract | $13,500 | $11,000 | $2,500 | Price per share * shares/cont |
| OWLS % Combined | | 74.07% | | Value of OWLS as a percent of the combined value 74.074% = 10,000/13,500 |
| OWLS value | $10,000 | $ 8,148.15 | $1,851.85 | Split based on the value of each company 8,148.15 = 11,000 * .74074 1,851.85 = 2,500 * .74075 |
| OWLS shares | | 74 | 18 | Number of shares of Co 1 & 2 |
| OWLS cash | | $ 8.15 | $ 51.85 | Cash in lieu of fractional shares |
| RISKS % Combined | | 25.93% | | Value of RISKS contract as a percent of the combined value 25.93% = 3,5000/13,500 |
| RISKS value | $ 3,500 | $ 2,851.85 | $ 648.15 | Split based of the value of each company 2,851.85 = .2593 * 11,000 648.15 = .2593* 2,500 |
| RISKS shares | 25 | 6 | | Number of shares of Co 1 & 2 |
| RISKS cash | $ 101.85 | $ 48.15 | | Cash in lieu of fractional shares |

For the remainder of the contract term, the adjustable DIVS holders receive the stream of dividend from both XYZ' and ABC multiplied by the number of shares they hold of each of these companies, which should be 4 shares of XYZ' for every share of ABC. Upon termination of the contracts, XYZ' is trading at the market price of $110/share while ABC trades at the market price of $100/share. An adjustable OWLS holder who initially owned 100 shares of XYZ with a TC of $100, has a adjustable derivative security that is now backed by $11,000 (100 shares*$110) worth of XYZ' stock and $2,500 worth of ABC stock (25 sh*$100), or $13,500 worth of the combined stocks. The adjustable OWLS holders, however, are only entitled to $10,000 of the $13,500 based on the original termination claim of $100 with respect to the original 100 pre-spin-off shares of XYZ. Accordingly, adjustable OWLS holders are only entitled to 74.074% ($10,000/$13,500) of the proceeds from each of XYZ and ABC, which entitles them to $8,148.15 of XYZ proceeds and $1,581.85 of ABC proceeds. If adjustable OWLS holders were being paid in the underlying shares of the companies with cash in lieu of fractional shares, these values would translate to a distribution of 74 shares of XYZ stock plus $8.15 and 18 shares of ABC stock plus $51.85. The adjustable RISKS holders would receive the remainder of the proceeds equating to $3,500, which would be a distribution of $2,851.85 of XYZ proceeds (or 25 shares of XYZ plus $101.85) and $648.15 of ABC proceeds (or 6 shares of ABC plus $48.15).

From time to time a corporation that issued the stock underlying the adjustable component contracts will announce a stock split, resulting in the issuance of new shares of stock for each existing share, characterized as a stock split. In accordance with an exemplary embodiment of the present invention as illustrated in Table 7, the adjustable components adjust to account for a three for two stock split. The holders of the underlying stock getting 1.5 shares of stock for each share she owned before the split is announced. Each investor in the underlying stock will get an additional half share of stock for each original share of stock, resulting in her having 1.5 times as many shares as originally and the price of each share is reduced by 33.33%, which is 1 divided by 1.5. Assuming there is no change in the dividend policy of the corporation, the dividend is reduced by 33.33% also. This results in the market value of the stock held by investors remaining the same before and after the split. The adjustable derivative securities of the present invention or the inventive method applied to the component contracts results in each adjustable component holder receiving 1.5 component contracts for each original component contract. Just as for the underlying stock the number of adjustable component contracts is increased by 50% and the price of the adjustable component contracts is reduced by 33.33% and the value of the positions held by investors in the adjustable component contracts remains approximately the same before and after the stock split. The adjustable derivative securities of the present invention and the inventive method can be applied to any stock split announced by the corporation. In general, the number of shares in the corporation and the number of component contracts are increased by the split ratio and the price of the stock and the adjustable component contracts are reduced by dividing the original prices by the split ratio, thus keeping the new price (the price of the stock times the number of shares) the same over the split event, and each component contract being backed by one share of the underlying stock.

the stock will be reduced to reflect the increased number of shares outstanding, typically reducing the price by 1 divided by one plus the dividend rate. In the example shown herein, the stock price is reduced to approximately 95.24% of its original value, with its actual price being determined by the market place. In accordance with an exemplary embodiment of the present invention as illustrated in Table 8, the adjustable derivative securities or component contracts adjust to 105 adjustable component contracts for each 100 original adjustable component contracts, with the termination claim being reduced to 95.24% of its original value. This results in the adjustable components still trading one for one with the

TABLE 7

STOCK SPLIT

Assumed Stock Parameters and Component Prices

| Dividend | $ 5.00 | Stock Price | $105.00 |
|---|---|---|---|
| Days to Term | 1460 | RISKS Price | 15.32 |
| Years to Term | 4 | OWLS Price | 71.84 |
| Termination Claim | $ 100.00 | DIVS Price | 17.84 |
| Standard Deviation | 16% | | |
| Risk Free Rate | 6% | | |

1. Each component holder will receive whole and/or fraction component shares for each original component held. The number of components or fractional components depends on the split ratio.
2. Component holders will receive cash worth the value of any fractional component resulting from the split.
3. The Termination Claim will be adjusted by dividing the original Termination Claim by the split ratio.
4. The DIVS will receive the dividends paid on the underlying stock.
5. The Termination Settlement Date will remain the same.

3 SHARES FOR 2 SHARES STOCK SPLIT

| | Pre Split | | | Post Split | | |
|---|---|---|---|---|---|---|
| | Shares/ Contracts | Price | Value | Shares/ Contracts | Price | Value |
| Common Stock | 100 | 105.00 | $10,500.00 | 150 | 70.00 | $10,500.00 |
| RISKS Component | 100 | 15.32 | $ 1,531.74 | 150 | 10.21 | $ 1,531.52 |
| OWLS Component | 100 | 71.84 | $ 7,184.07 | 150 | 47.90 | $ 7,184.29 |
| DIVS Component | 100 | 17.84 | $ 1,784.19 | 150 | 11.89 | $ 1,784.19 |
| Ann Stock Dividend | | 5 | | | 3.33 | |
| Termination Claim | | 100 | | | 66.67 | |

From time to time a corporation may increase the number of shares each investor in the corporation owns by declaring a stock dividend. As an example, the company may announce a 5.00% stock dividend. This results in each share holder receiving 5 new shares of stock for each 100 shares she owns, thereby increasing her holding to 105 shares for every 100 shares held by her previously. At the same time, the price of shares of the underlying stock. In the example herein, the value of the assumed adjustable OWLS and RISKS positions are reduced relative to their values before the stock dividend assuming the dollar dividend per share has not changed, thereby resulting in an effective 5% dividend increase which will negatively impact the market prices of the adjustable OWLS and RISKS.

TABLE 8

STOCK DIVIDEND

Assumed Stock Parameters and Component Prices

| Dividend | $ 5.00 | Stock Price | $105.00 |
|---|---|---|---|
| Days to Term | 1460 | RISKS Price | 15.32 |
| Years to Term | 4 | OWLS Price | 71.84 |
| Termination Claim | $ 100.00 | DIVS Price | 17.84 |
| Standard Deviation | 16% | | |
| Risk Free Rate | 6% | | |

1. The number of component contracts is adjusted to reflect the number of new common stock shares issued per old share.
2. The Termination Claim is adjusted by dividing the original Termination Claim by the ratio of new common shares to old common shares.

TABLE 8-continued

STOCK DIVIDEND

3. The DIVS will receive dividends as paid on the underlying stock.
4. The Termination Settlement Date remains the same.

5.00% STOCK DIVIDEND

| | Pre Split | | | Post Split | | |
|---|---|---|---|---|---|---|
| | Shares/Contracts | Price | Value | Shares/Contracts | Price | Value |
| Common Stock | 100 | 105.00 | $10,500.00 | 105 | 100.00 | $10,500.00 |
| RISKS Component | 100 | 15.32 | $ 1,531.74 | 105 | 14.01 | $ 1,461.18 |
| OWLS Component | 100 | 71.84 | $ 7,184.07 | 105 | 68.15 | $ 7,155.42 |
| DIVS Component | 100 | 17.84 | $ 1,784.19 | 105 | 17.84 | $ 1,873.40 |
| Ann Stock Dividend | | 5 | | | 5.00 | |
| Termination Claim | | 100 | | | 95.24 | |

While the present invention has been particularly described with respect to the illustrated embodiments, it will be appreciated that various alterations, modifications and adaptations may be made based on the present disclosure, and are intended to be within the scope of the present invention. It is appreciated that although the invention has been described with respect to derivative securities with any number of components, the disclosed invention may be similarly applied to derivative securities with one or more components. It is intended that the appended claims be interpreted as including the embodiments discussed above, the various alternatives that have been described, and all equivalents thereto.

What is claimed:

1. A system for adjusting one or more terms of derivative contracts to account for time value of money due to an occurrence of a corporate event, comprising:

a computer programmed to:

receive financial information regarding the derivative contracts comprising at least a termination claim of the equity derivative and the length of the derivative contract, wherein each derivative contract represents one of three economic components of an underlying security: a DIVS component representing a stream of dividends distributed to holders of the underlying security, a RISKS component representing a speculation on future gains of the underlying security, and an OWLS component represents the remaining value of the underlying security absent the DIVS and RISKS components, and wherein the termination claim determines the payout between the OWLS and DIVS components at the end of the derivative contract;

receive information identifying a corporate event that affects a term of the derivative contract;

adjust the termination claim of the derivative contract to its present value based at least on the length of time remaining on the derivative contract to account for the time value of money;

determine any needed formulas, from a plurality of predefined formulas, for determining the effect of the corporate event on the DIVS component, RISKS component, and OWLS component, wherein the determined formulas account for the time value of money; and adjust said one or more terms of the DIVS component, the RISKS component, and the OWLS component based on the determined formulas and the adjusted termination claim; and a computer storage disk programmed to store the adjusted termination claim, the adjusted DIVS component, the adjusted RISKS component, and the adjusted OWLS component, and to update records associated with holders of the derivative contract.

2. The system of claim 1, wherein the computer adjusts the termination claim based on a discount rate, wherein the discount rate is either the risk-free rate or a pre-determined rate.

3. The system of claim 1, wherein said corporate event is a full liquidating dividend.

4. The system of claim 1, wherein the computer adjusts the DIVS component to the present value of a remaining stream of dividends expected on the underlying security.

5. The system of claim 1, wherein the corporate event is a partial liquidating dividend and wherein the termination claim is adjusted based on a future value of said partial liquidating dividend.

6. The system of claim 5, wherein the computer adjusts the termination claim based on either the risk free rate of return or any other predetermined rate.

7. The system of claim 5, wherein the computer adjusts the termination claim based on an expected internal rate of return of one of the equity derivative contracts.

8. The system of claim 5, wherein the computer adjusts the DIVS component to the present value of a remaining stream of dividends expected on the underlying security which will no longer be paid due to the partial liquidating dividend.

9. The system of claim 1, wherein the corporate event is a special dividend and wherein the computer adjusts the termination claim based on a future value of the special dividend.

10. The system of claim 1, wherein the computer adjusts the termination claim based on a change in the structure of the underlying security due to the corporate event.

11. The system of claim 10, wherein the corporate event is a spin-off or split-up resulting in multiple entities and wherein the termination claim is allocated amongst said multiple entities.

12. The system of claim 9, wherein the computer adjusts the DIVS component to receive a specified percentage of the special dividend, and adjusts the termination claim based on a future value of the special dividend less any distribution made to the DIVS component.

13. The system of claim 1, wherein the computer adjusts the DIVS component based on a remaining stream of dividends expected on the underlying security, and adjusts the RISKS and OWLS components based on distributions to the dividend component and the termination claim.

* * * * *